US008639845B2

(12) United States Patent
Gegout

(10) Patent No.: US 8,639,845 B2
(45) Date of Patent: Jan. 28, 2014

(54) METHOD FOR EDITING MULTIMEDIA PAGES ON A TERMINAL USING PRE-STORED PARAMETERS OF OBJECTS APPEARING IN SCENES

(75) Inventor: Cédric Gegout, Rennes (FR)

(73) Assignee: France Telecom, Paris (FR)

( * ) Notice: Subject to any disclaimer, the term of this patent is extended or adjusted under 35 U.S.C. 154(b) by 564 days.

(21) Appl. No.: 10/589,196

(22) PCT Filed: Feb. 13, 2004

(86) PCT No.: PCT/FR2004/000340
§ 371 (c)(1),
(2), (4) Date: Jul. 18, 2008

(87) PCT Pub. No.: WO2005/088928
PCT Pub. Date: Sep. 22, 2005

(65) Prior Publication Data
US 2009/0217157 A1 Aug. 27, 2009

(51) Int. Cl.
*G06F 15/16* (2006.01)
*G06F 17/00* (2006.01)
*H04H 40/00* (2008.01)

(52) U.S. Cl.
USPC ........... 709/246; 715/205; 715/204; 715/202; 455/3.06; 709/249

(58) Field of Classification Search
USPC .................. 370/487; 709/236, 203, 204, 205; 726/28
See application file for complete search history.

(56) References Cited

U.S. PATENT DOCUMENTS

| | | | | |
|---|---|---|---|---|
| 4,692,858 A * | 9/1987 | Redford et al. | ............... | 715/744 |
| 5,461,716 A * | 10/1995 | Eagen et al. | .................. | 715/788 |
| 6,212,536 B1 * | 4/2001 | Klassen et al. | ................ | 715/205 |
| 6,363,421 B2 * | 3/2002 | Barker et al. | ................. | 709/223 |
| 6,438,575 B1 * | 8/2002 | Khan et al. | .................... | 709/200 |
| 7,685,229 B1 * | 3/2010 | George et al. | ................. | 709/203 |
| 2001/0040900 A1 * | 11/2001 | Salmi et al. | .................. | 370/487 |
| 2002/0109734 A1 * | 8/2002 | Umezu et al. | ................. | 345/846 |
| 2002/0152229 A1 * | 10/2002 | Peng | ............................ | 707/203 |
| 2004/0163045 A1 * | 8/2004 | Hui et al. | ...................... | 715/513 |

(Continued)

FOREIGN PATENT DOCUMENTS

DE 100 47 338 A1 4/2002

OTHER PUBLICATIONS

Niedermermeier et al., "An MPEG-7 tool for compression and streaming of XML data"—Proceedings 2002 IEEE International Conference on Multimedia and Expo—vol. 1, Aug. 26, 2002.

(Continued)

*Primary Examiner* — Joseph Avellino
*Assistant Examiner* — Aftab Nasir Khan
(74) *Attorney, Agent, or Firm* — Knobbe Martens Olson & Bear LLP

(57) ABSTRACT

The invention relates to multimedia page editing via a terminal. A server supplies multimedia pages to the terminal in the form of object arrangement commands for objects identified by parameters. A method according to the invention comprises a preliminary step wherein the server transmits all or part of the object-related parameters as well as a store command, whereby the parameters are stored in a terminal memory; and a main step wherein the server transmits a simple parameter retrieval command for editing at least one multimedia page in which the above-mentioned object appears.

9 Claims, 2 Drawing Sheets

(56) References Cited

U.S. PATENT DOCUMENTS

Figure 1:
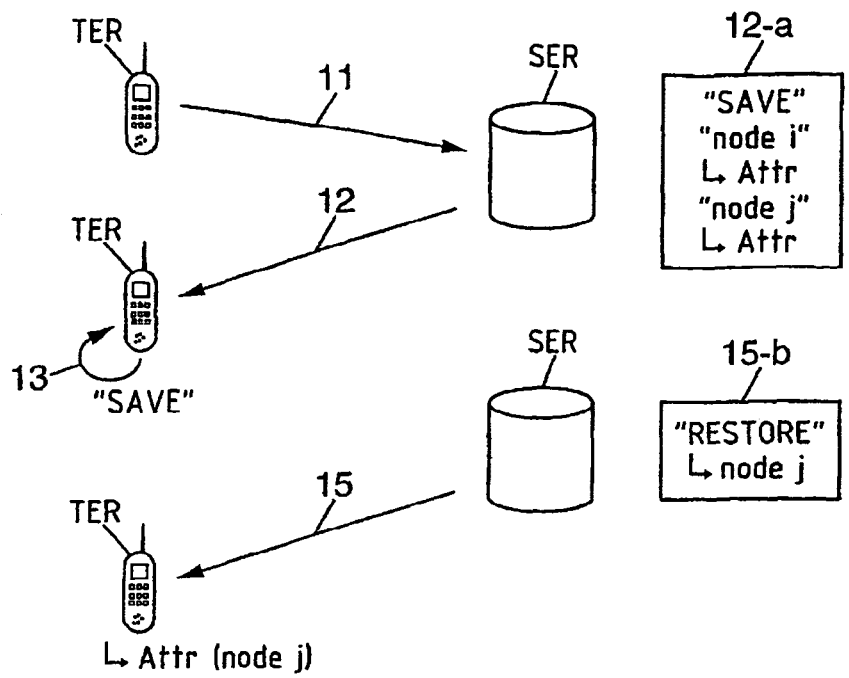

| | | | |
|---|---|---|---|
| 2006/0004910 A1* | 1/2006 | Burd et al. | 709/203 |
| 2007/0179927 A1* | 8/2007 | Vaidyanathan et al. | 707/1 |
| 2008/0096174 A1* | 4/2008 | Bodlaender et al. | 434/308 |
| 2008/0104269 A1* | 5/2008 | Vitanov et al. | 709/236 |
| 2009/0125883 A1* | 5/2009 | Barsness et al. | 717/119 |
| 2009/0235364 A1* | 9/2009 | Cohen et al. | 726/28 |

OTHER PUBLICATIONS

Girardot et al., "Efficient representation and streaming of XML content over the Internet medium"—Multimedia nd Expo, 2000. ICME 2000. 2000 IEEE International Conference on New York, NY, USA Jul. 30-Aug. 2, 2000, Piscataway, NJ, USA, IEEE, US.

* cited by examiner

METHOD FOR EDITING MULTIMEDIA PAGES ON A TERMINAL USING PRE-STORED PARAMETERS OF OBJECTS APPEARING IN SCENES

This application claims priority from PCT Application No. PCT/FR2004/000340 filed Feb. 13, 2004, which is hereby incorporated by reference in its entirety.

The invention relates to the editing of multimedia pages on terminals, in particular in the context of multimedia services provided on cell phones arranged to cooperate with cellular networks.

In the context of the invention, a server supplies one or more terminals with at least some multimedia pages in the form of object arrangement instructions for objects occurring in a multimedia page and identified by associated parameters.

The term "multimedia page" is used, for example, to mean a graphic scene to be edited on the terminal, possibly augmented by one or more sound sequences to be played on terminal headphones or speakers.

In this context, one and the same object (for example a graphic object in a graphic scene) can be used from one page to another, or one and the same object can retain the same arrangement parameters from one multimedia page to the next. In this case, the problem then arises of the systematic and unnecessary transmission and storage of data relating to this object or even to arrangement parameters of the same object, for a number of pages in which the same object occurs with the same arrangement parameters. This problem becomes particularly acute when there is a need for a number of interchanges between the terminal and the server, all the more so when the bandwidth allocated for communication between the server and the terminal (particularly a cell phone) may be restricted.

The present invention proposes a mechanism for storing information on the objects that appear in the description of a multimedia page.

Regarding the editing of graphic scenes, a number of graphic formats for representing graphic animations currently exist. However, none of these formats proposes such a storage mechanism.

Techniques that make it possible to store the partial information of a graphic scene, but which use for this purpose programmatic methods (for example, the MPEG/MPEGJ or VRML/EAI formats), for a quite different purpose from that of the present invention, are known. Moreover, these techniques suffer from a lack of flexibility, in that it is impossible to download pieces of programmatic content. They also suffer from a lack of efficiency in graphic rendition, in that it is often necessary to run a virtual machine to process the programmatic content.

One aim of the present invention concerns reducing the memory, in particular graphic memory, of the terminals needed to edit complex multimedia pages, or a succession of such pages.

Another aim of the present invention concerns reducing the computation resources needed to edit such pages, or a succession of such pages.

Another aim of the present invention is to provide a method with which to accomplish the abovementioned aims while offering compatibility with the conventional decoding techniques.

More generally, an aim of the present invention is to offer greater flexibility in the requests and data interchanged between the server and the terminal.

The present invention first proposes a method in which a server supplies one or more terminals with at least some multimedia pages in the form of object arrangement instructions for objects identified by associated parameters,
this method comprising:
a) at least a preliminary step during which the server transmits at least some of the parameters associated with an object, and an instruction to store said parameters in a terminal memory,
b) and at least a main step during which the server transmits a simple instruction to restore said parameters previously stored in terminal memory, to edit at least one multimedia page in which said object occurs.

Thus, the method according to the invention makes it possible to reduce the terminal memory, in particular its graphic memory, for example, in the context of editing graphic scenes, since only the store command, for example for storing information on graphic nodes describing objects occurring in one or more scenes, is stored.

The method according to the invention also makes it possible to save on the use of computation resources, since, typically, the use of a programmatic content as is proposed in MPEG-4/System/MPEGJ (or in SVG/DOM) would induce a net computation overhead, at least for certain animations. Advantageously, the method according to the invention, using a mechanism according to a conventional graphic or sound control rendition process, is then easy to implement, particularly for a system with mobile terminals.

The method according to the invention also offers compatibility with the conventional decoding techniques, since the method can be implemented in most graphic and/or sound rendition devices.

According to an advantageous characteristic, the step b) alone is repeated to edit a number of multimedia pages in which said object occurs.

In an embodiment, the stored parameters comprise at least declarative attributes of an arrangement of the object in one or more multimedia pages in which this object occurs with the same attributes.

Preferably, these parameters also include an identifier of a memory area of the terminal allocated to store the attributes and, advantageously, the restore instruction includes the identifier of this memory area to retrieve the abovementioned attributes.

In a preferred embodiment, the method also comprises an end-of-editing step for multimedia pages including the abovementioned object, a step in which the server transmits to the terminal an instruction to delete the parameters associated with this object.

Advantageously, this delete instruction includes the identifier of the memory area of the terminal storing the parameters associated with said object, to delete these parameters from this memory area.

In an advantageous embodiment, the above-mentioned object is a graphic object comprising at least one of the following elements:
an image,
a sequence of images,
a sequence of 2D (two-dimensional) synthetic images,
and a sequence of 3D (three-dimensional) synthetic images.

It should be indicated that such sequences of images are likely to be used, for example, by the MPEG-4 standard.

Since the abovementioned instructions, in particular the store and restore instructions, individually appear to be an essential means for implementing the above method, another aim of the present invention is to produce a program product in the form of computer code, and including an instruction to store, in a memory of a terminal, parameters of at least one object intended to be arranged, according to said parameters, in a multimedia page suitable for editing on said terminal. Another aim of the present invention is to provide a signal comprising this code. This signal and/or the program product itself, can be transmitted from the server to the terminal, or even originate from a memory medium that cooperates with a drive of the terminal (such as a CD-ROM or other drive).

Another aim of the present invention is to produce a program product in the form of computer code, and including an instruction to restore parameters previously stored in a memory of a terminal, these parameters being associated with at least one object intended to be arranged, according to said parameters, in a multimedia page suitable for editing on said terminal. Another aim of the present invention is to provide a signal comprising this code. This signal and/or the program product itself, can be transmitted from the server to the terminal, or even originate from a memory medium that cooperates with a drive of the terminal (such as a CD-ROM or other drive).

Finally, another aim of the present invention is to produce a program product in the form of computer code, and including an instruction to delete parameters previously stored in a memory of a terminal and associated with at least one object to be arranged, according to said parameters, in a multimedia page edited on said terminal. Another aim of the present invention is to produce a signal comprising this code. This signal and/or the computer program product itself, can be transmitted from the server to the terminal, or even originate from a memory medium that cooperates with a drive of the terminal (such as a CD-ROM or other drive).

Figure 2:
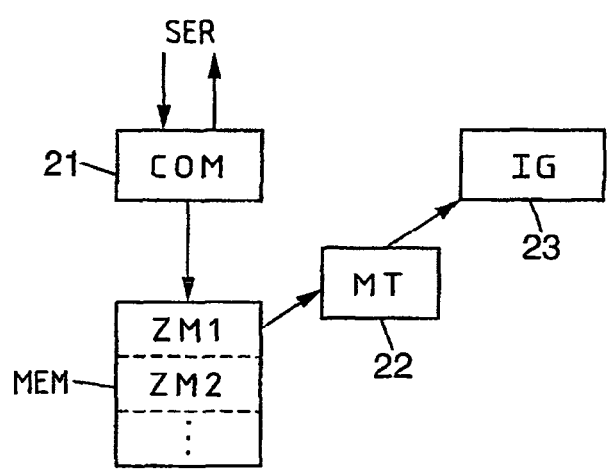
Figure 3:
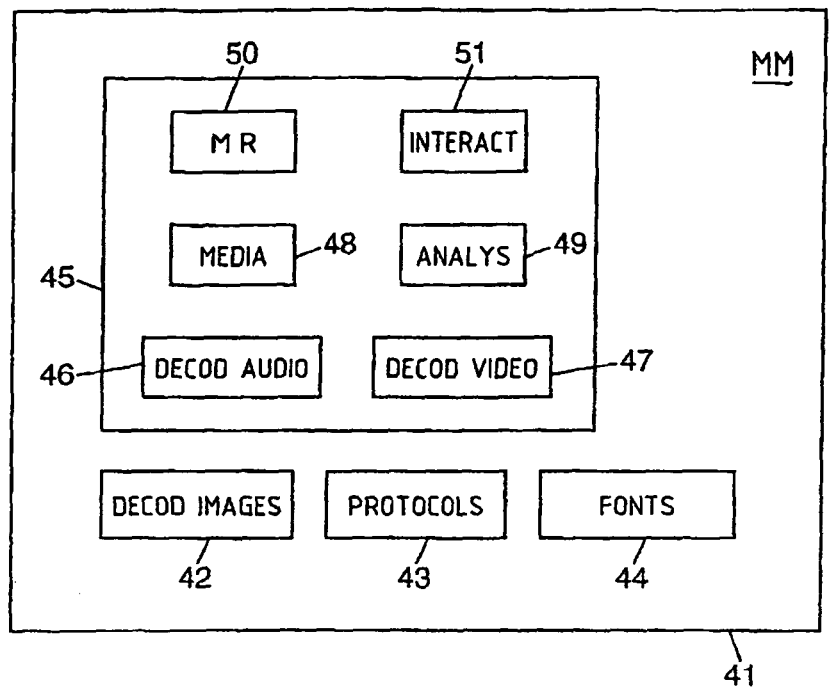

Other characteristics and advantages of the invention will become apparent from studying the detailed description below, and the appended drawings in which:

FIG. 1 illustrates the interchanges between a server SER and a terminal TER, for the steps of the method according to the invention, FIG. 2 diagrammatically and partially represents the elements of a terminal TER, FIG. 3 represents the software agents interacting to edit multimedia pages on the terminal TER.

The appendix contains a transcription of the computer codes (in binary format), respectively for the "SAVE" (abovementioned store command), "RESTORE" (abovementioned restore command) and "CLEAN" (abovementioned delete command) commands. It must be understood that the description and its appendix in particular describe characteristics that might contribute to the definition of the invention.

By referring to FIG. 1, the application context of the invention can be described by the following steps:

The mobile terminal TER requests one or more multimedia pages defining, for example, a graphic animation content, from a server SER (step 11).

The server SER returns a content that describes the space-time arrangement of the graphic objects occurring in the graphic animation (step 12).

In this content, a store function "SAVE" (corresponding to the abovementioned store instruction) is described in the table 12-a. This function indicates to the terminal TER that it must store parameters relating to different objects likely to occur in future graphic scenes to be generated. These objects are identified by graphic nodes i, j with which are associated in particular specific attributes (Attr).

When the terminal receives this store command "SAVE", the "value" of the graphic object (in particular of its attributes) is stored in the mobile terminal memory (step 13).

If the terminal TER then receives (step 15) a "RESTORE" command (corresponding to the abovementioned restore instruction), at the moment when it renders the graphic scene, it must execute this command. The terminal recovers the information for the stored graphic object to copy it into the current graphic scene.

Naturally, if parameters associated with a graphic object are no longer useful for editing subsequent graphic scenes, the server can send the terminal a "CLEAN" command to delete these parameters from the terminal memory.

Thus, these commands are used to modify a set of properties of a scene at a given instant. The commands that must be executed at the same instant are preferably grouped in one and the same packet (for example an AccessUnit packet in MPEG-4/System, or even an RTP packet). In order to modify the scene, the server must therefore transmit packets that contain one or more of these commands.

Reference is now made to FIG. 2 to briefly describe the modules conventionally provided in a terminal TER. The terminal comprises a communication module 21, for communication in particular with the server SER, from which it receives the abovementioned commands. Typically, the SAVE command includes an identifier of a memory area ZMi (i=1, 2, etc.) in a memory MEM provided in the terminal TER, to store the parameters associated with the SAVE command in this memory area ZMi. Thus, a subsequent RESTORE command, including the same identifier of this memory area ZMi, can be used to recover these parameters from the memory MEM of the terminal, these parameters being processed in a working memory 22 (for example by software on the terminal called "PLAYER"), possibly separate from the memory MEM. The information concerning the objects of the scene being generated is then transferred to an interface 23, for example a graphical user interface for displaying the scene (or even via a sound interface for a sound rendition). Similarly, the "CLEAN" command includes an identifier of the memory area ZMi to then delete the parameters stored in this area that are no longer useful.

There follows a definition of the semantics of the following commands: "SAVE", "RESTORE" and "CLEAN".

The "SAVE" command is used to store in memory certain attributes (or a tree-structure of attributes) of a node (or graphic object) contained in the current scene. A saved node remains permanently in memory.

The following nodes can be stored:

Text: the attributes color and string (character string) can be stored, for example, for a text to be displayed.

After a SAVE command, the node concerned can advantageously not be stored if the memory MEM of the terminal is completely full.

Referring to the appendix transcribing the computer code of the "SAVE" command, the attributes serviceID and groupID specify a memory area ZMi where the information must be stored.

More specifically, the serviceID attribute is an integer indicating the service or the reference of a content (reference of the graphic object to be edited), whereas the groupID integer indicates the naming space of the nodes associated with this object. Finally, the "nodes" parameter corresponds to a list of nodes in which each node is referenced by its name (or its identifier ID).

The RESTORE command (transcribed in the appendix) can be used to recover nodes that have been stored previously by the SAVE command. The recovered nodes will replace the current nodes in the current scene according to their name or their identifier ID.

The CLEAN command (transcribed in the appendix) can be used to delete the memory area identified by the service ID and groupID attributes.

Even more specifically, the computer codes transcribed in the appendix are in synthetic description language (SDL). This language is adopted to define the bitstream formats. In particular, bytes are associated with each field, as will be seen in detail below. Additional information concerning this language can be found in the description of the ISO standard IEC 144-96.

It is indicated here that the SAVE command is declared by the instruction const bit(4) 9 which means that the SAVE command is declared by the integer "9" which must be located in the first four bits of the bitstream received by the terminal. Thus, if these first four bits include the integer "9", they will declare the SAVE command.

The next command "uint(12) serviceID" defines the context in which a graphic (or sound) node of a multimedia page is identified. More specifically, the command "uint(i)" is used to declare an unsigned integer of i bits. It is indicated that "serviceID" can target a multimedia site, for example. The next command declares a "groupID" parameter which relates to a multimedia page, for example, from the "serviceID" site. Finally, the declaring command "nbIds" is used to indicate the number of objects (graphic or sound), identified by "id[i]", that will be saved in the terminal memory.

Then, the RESTORE command is declared by the integer "10", in the four first bits of the bitstream. Since the "serviceID" and "groupID" identifiers are also declared in the "RESTORE" command, the terminal directly accesses the memory address where the parameters relating to the object "id[i]" (or the objects "id[nbIds]") are stored.

Similarly, the delete command "CLEAN" is declared, for example by the integer "8" in the first four bits of the bitstream. The memory area in which the data must be deleted is identified, in the same way, by the "serviceID" and "groupID" parameters.

As an example, it is indicated that a possible application of the store commands according to the invention can be as described below. A user of the terminal who lives in a town such as Rennes (France) wants, for example for a weather forecasting application, to know what climatic conditions are forecast for the coming days, in this same town of Rennes. Thus, when the user of the terminal selects the town "Rennes" on his terminal, for example via an interactive command, the information relating to the interest in Rennes manifested by the user is transmitted to the server. The server indicates, via the "SAVE" command, that the terminal must store the parameters identifying the node "Rennes", given that this town is likely to be of interest subsequently, for the user of the terminal. It is indicated that the server has also stored information relating to the fact that it has sent the "SAVE" command to this terminal. Thus, the terminal is identified in a memory of the server, mapped to the "SAVE" command. This enables the server to then send to the terminal a "RESTORE" command, when it transmits future information, relating to the town of Rennes, for example for a weather forecasting application.

Thus, using commands that are as simple as those represented in the appendix (so-called "low-level" commands), the server does not need to systematically transmit the parameters relating to the node (or multimedia page object) that the user usually consults, and, more generally. The latter are already stored by the "SAVE" command in the memory of the terminal of this user. The server simply sends a "RESTORE" command to recover these parameters.

Usually, most of the graphic scenes require a representation in the form of a list of graphic rendition primitives (low-level functions). Each of these primitives has a corresponding single, simple function to assign a graphic editing parameter. The store functions, according to the invention, advantageously appear like low-level functions. A low-level representation of the store functions can be used in particular to have a detailed interaction with the objects of the animation and a binary transfer between the server and the terminal.

Reference is now made to FIG. 3 to describe a model of graphic scene transmission and rendition.

A plurality of modules 42 (various image decoders), 43 (network protocol management), 44 (text font (or character) management), are stored in memory 41 of the terminal TER, as memory-resident. Furthermore, a client software 45, called "PLAYER", is also stored as memory-resident in the memory 41.

The PLAYER 45 is used to display animated, interactive and multimedia contents on the mobile terminal. Mainly, this software downloads or reads information that describes the space-time arrangement of graphic objects, the way in which they are synchronized and the interactions of the user of the terminal that are possible on this content.

The PLAYER 45 then interprets the interactions of the user and deduces from them the appropriate behaviors of the graphic objects or the requests to be made to the content server. The PLAYER 45 (for example of "STREAMEZZO" type) includes graphic object rendition functions and engines for display (graphic rendition engine 50) and interaction (interaction engine 51) with the multimedia scene. The PLAYER 45 uses the modules 42, 43, 44 as API (Application Program Interface) for the system of the mobile terminal that are used:

to decode the images (module 42),
to recover a stream coming from the network or from a local source (module 43), and
to manage the display of the text and in particular the fonts resident as standard in the mobile terminal (module 44).

The contents for editing comprise animated vector graphics, sound, video and user interactions. Displaying interactive multimedia contents in mobile environments normally entails using compression techniques in order to ensure an effective provision of the content and an optimization of the rendition of the graphic objects that make up this content. This content can then be displayed in good conditions on the mobile terminals. The information read or downloaded by the PLAYER 45 is then highly compressed and the PLAYER must therefore decompress this data and interpret it on the fly to play the content.

More specifically, the PLAYER 45 includes audio and video decoding modules, respectively 46 and 47, a decoded stream analyzer 49, a media manager 48, a rendition engine (graphic or sound) 50 and an interactivity engine 51.

The operation of the PLAYER software can be described by the following steps:

entry of the input data via a network connection or a file read,
decompression of this data in order to obtain a description of the graphic objects that can be directly used by the audio and graphic rendition engine 50,
composition of the graphic objects together to create a graphic scene,
graphic rendition proper of the audio and graphic objects, by displaying visual objects or by playing a sound,
recognition of the user interactions, for example a click on a pointer, or a key press, or other, setting up of a connection to a local or remote information source if necessary.

Following a request from the user, the latter step will consist in opening a connection to the server SER and recovering a bitstream. This bitstream is analyzed by the PLAYER 45 which then creates an object SceneGraph containing the various objects of the scene in the form of nodes of a graph. The information stream is divided into packets which contain information which, in a preferred embodiment, is valid only at a given instant and corresponds to a single type of information ("AccessUnit" principle of the MPEG-4 standard).

The PLAYER analyzes each packet and executes the commands that are described in it according to its clock (not shown in the figures), which supplies the time of the multimedia scene.

Thus, it will be understood that this PLAYER 45, particularly with the other modules 42, 43 and 44 of the terminal, can handle the process for receiving and decoding functions for storing the space-time arrangement of graphic objects occurring in the multimedia pages, including, for example, graphic scenes and/or sound contents. These store functions according to the present invention can be used to manage the representation of the objects and/or the modification of their arrangement. Thus, the store functions can be used to link a number of graphic and/or sound scenes into a composite multimedia service.

It should be indicated that the method according to the invention, very generally, can be applied to practically all the current graphic animation descriptions, such as MPEG-4BIFS, SVG, and others, provided that a representation of the signals that make up an application in the form of a space-time arrangement of graphic objects is provided.

APPENDIX

```
Save {
    const bit(4) 9;
    uint(12) serviceID;
    uint(8) groupID;
    uint(lenBits) nbIds;
    for (int i = 0; i < nbIds; i++) {
        uint(idBits) id[i];
    }
}
Restore {
    const bit(4) 10;
    uint(12) serviceID;
    uint(8) groupID;
}
Clean {
    const bit(4) 8;
    uint(12) serviceID;
    uint(8) groupID;
}
```

The invention claimed is:

1. A method of editing multimedia pages on a terminal, comprising:

supplying, from a server to at least one terminal, multimedia pages in a form of object arrangement instructions, in order to arrange objects in a graphic scene, each object being identified by a set of associated parameters, wherein said object is a graphic object comprising at least one of an image, a sequence of images, a sequence of 2D synthetic images, or a sequence of 3D synthetic images;

transmitting, from the server, at least a part of said set of associated parameters, and an instruction to store said part of said set of associated parameters in a memory of the terminal; and transmitting, from the server, an instruction to restore said part of said set of associated parameters previously stored in said memory of the terminal, to edit at least one multimedia page in which an object identified by said set of associated parameters occurs, wherein the instruction to store indicates information on graphic nodes describing objects arranged in one or more graphic scenes and the instruction to restore indicates parameters previously stored in terminal memory to edit at least one multimedia page in which at least one of said objects occurs;

transmitting, from the server to the at least one terminal, an instruction to delete said part of said set of associated parameters, to edit at least one multimedia page in which said object identified by said set of associated parameters occurs;

wherein the instruction to delete includes the identifier of said memory area of the terminal to delete from said memory area the set of associated parameters; and wherein the at least one terminal is a mobile terminal arranged to cooperate with a cellular network.

2. The method as claimed in claim 1, wherein the instruction to restore is repeated to edit a number of multimedia pages in which said object occurs.

3. The method as claimed in claim 1, further comprising:
transmitting, from the server to the at least one terminal, an instruction to delete said part of said set of associated parameters, to edit at least one multimedia page in which said object identified by said set of associated parameters occurs.

4. The method as claimed in 1, wherein said instructions are transmitted in packets from the server to the terminal.

5. The method as claimed in claim 1, wherein said instructions are in the form of commands corresponding to programmable code.

6. The method as claimed in claim 1, wherein said parameters comprise at least declarative attributes of an arrangement of the object in a multimedia page.

7. The method as claimed in claim 6, wherein said parameters also include an identifier of a memory area of the terminal allocated to store said attributes.

8. The method as claimed in claim 7, wherein the restore instruction includes the identifier of said memory area to retrieve said attributes.

9. A non-transitory computer readable medium storing a program product in the form of computer code, wherein said program product includes instructions for performing the method of claim 1 when said instructions are executed by a processor.

* * * * *

UNITED STATES PATENT AND TRADEMARK OFFICE
CERTIFICATE OF CORRECTION

| | | |
|---|---|---|
| PATENT NO. | : 8,639,845 B2 | Page 1 of 1 |
| APPLICATION NO. | : 10/589196 | |
| DATED | : January 28, 2014 | |
| INVENTOR(S) | : Cedric Gegout | |

It is certified that error appears in the above-identified patent and that said Letters Patent is hereby corrected as shown below:

In the Claims:

In column 8 at line 39, In Claim 4, change "in 1," to --in claim 1,--.

Signed and Sealed this
Twenty-ninth Day of July, 2014

Michelle K. Lee
*Deputy Director of the United States Patent and Trademark Office*